No. 692,610. Patented Feb. 4, 1902.
F. A. BROWNELL.
FOCUSING DEVICE FOR PHOTOGRAPHIC CAMERAS.
(Application filed Sept. 20, 1901.)
(No Model.) 3 Sheets—Sheet 1.
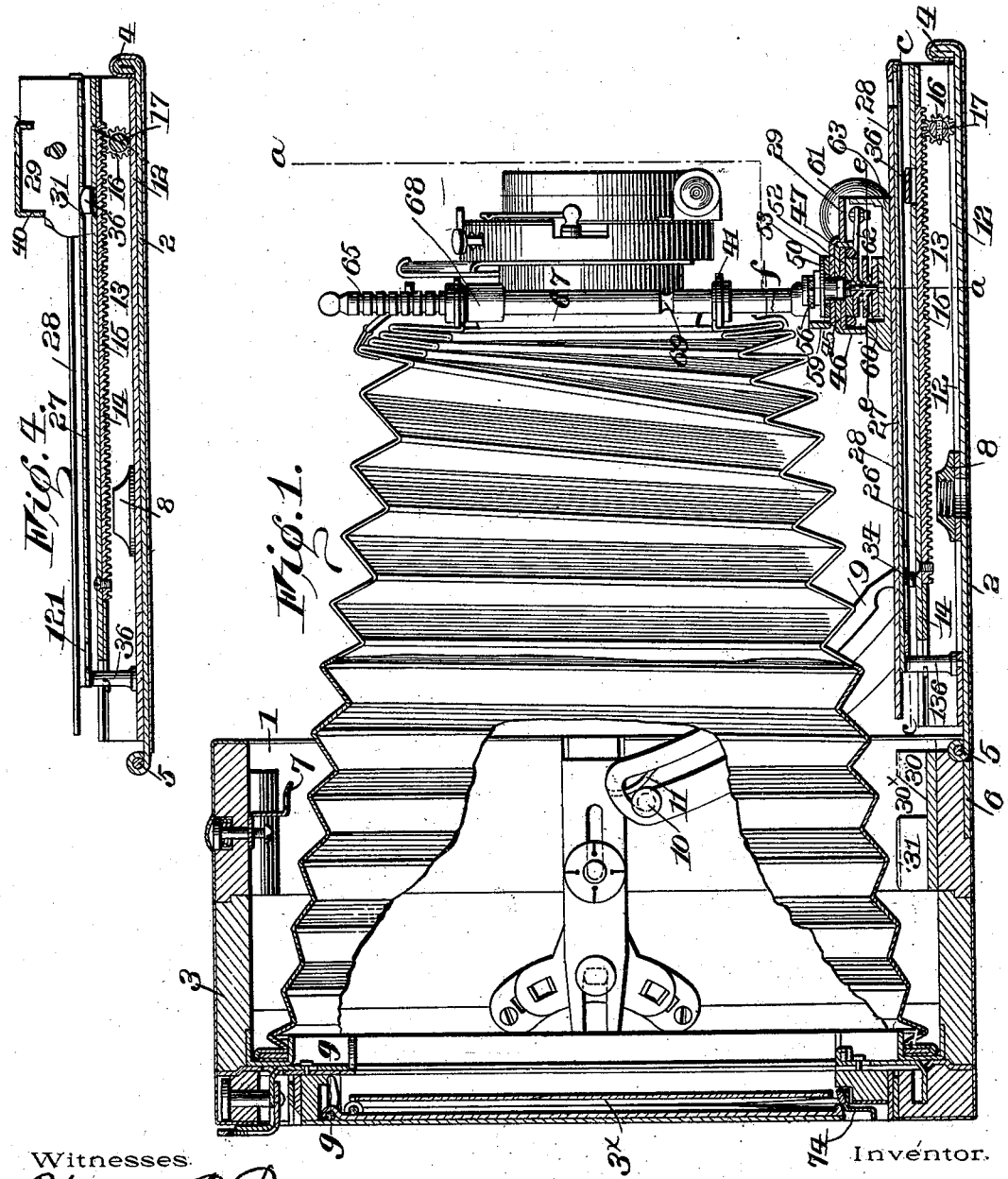
Witnesses. Inventor.

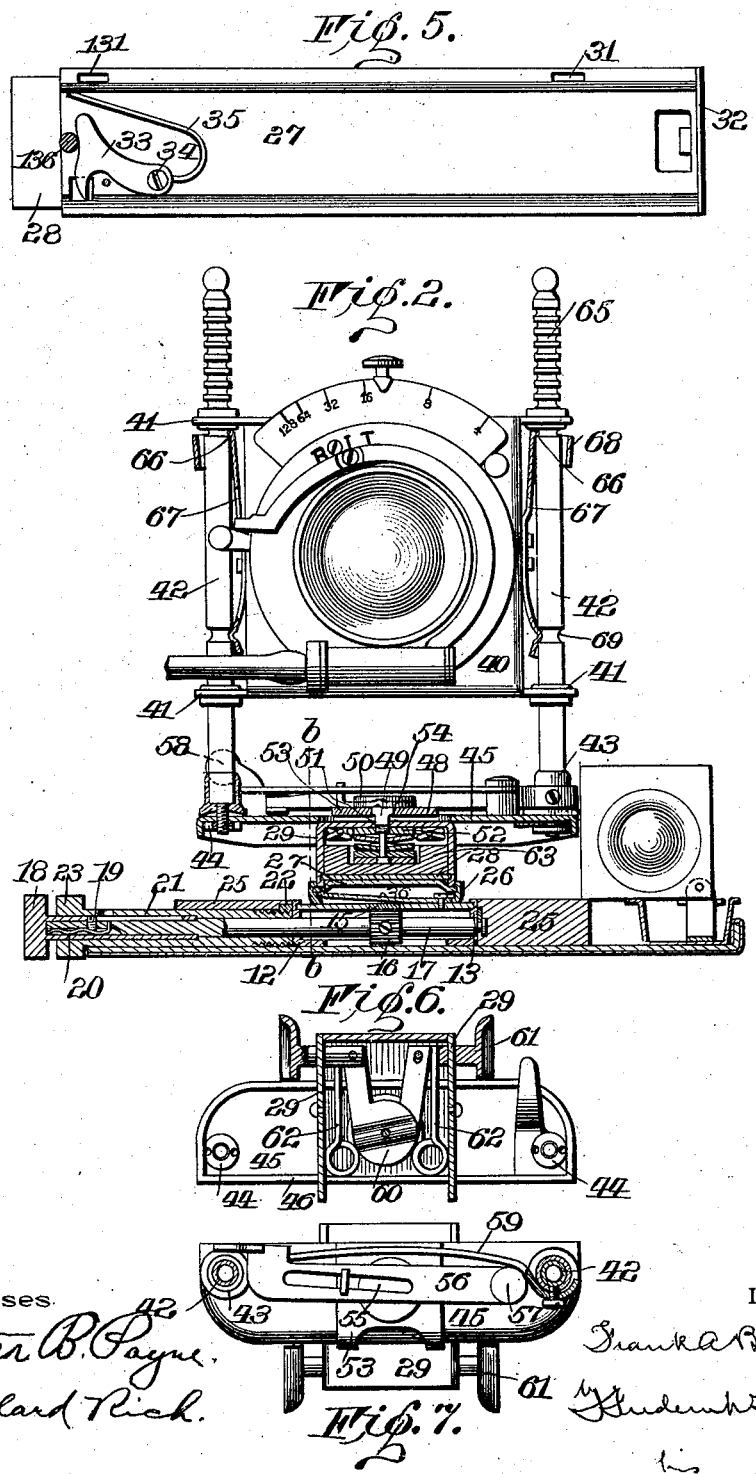

No. 692,610. Patented Feb. 4, 1902.
F. A. BROWNELL.
FOCUSING DEVICE FOR PHOTOGRAPHIC CAMERAS.
(Application filed Sept. 20, 1901.)
(No Model.) 3 Sheets—Sheet 3.
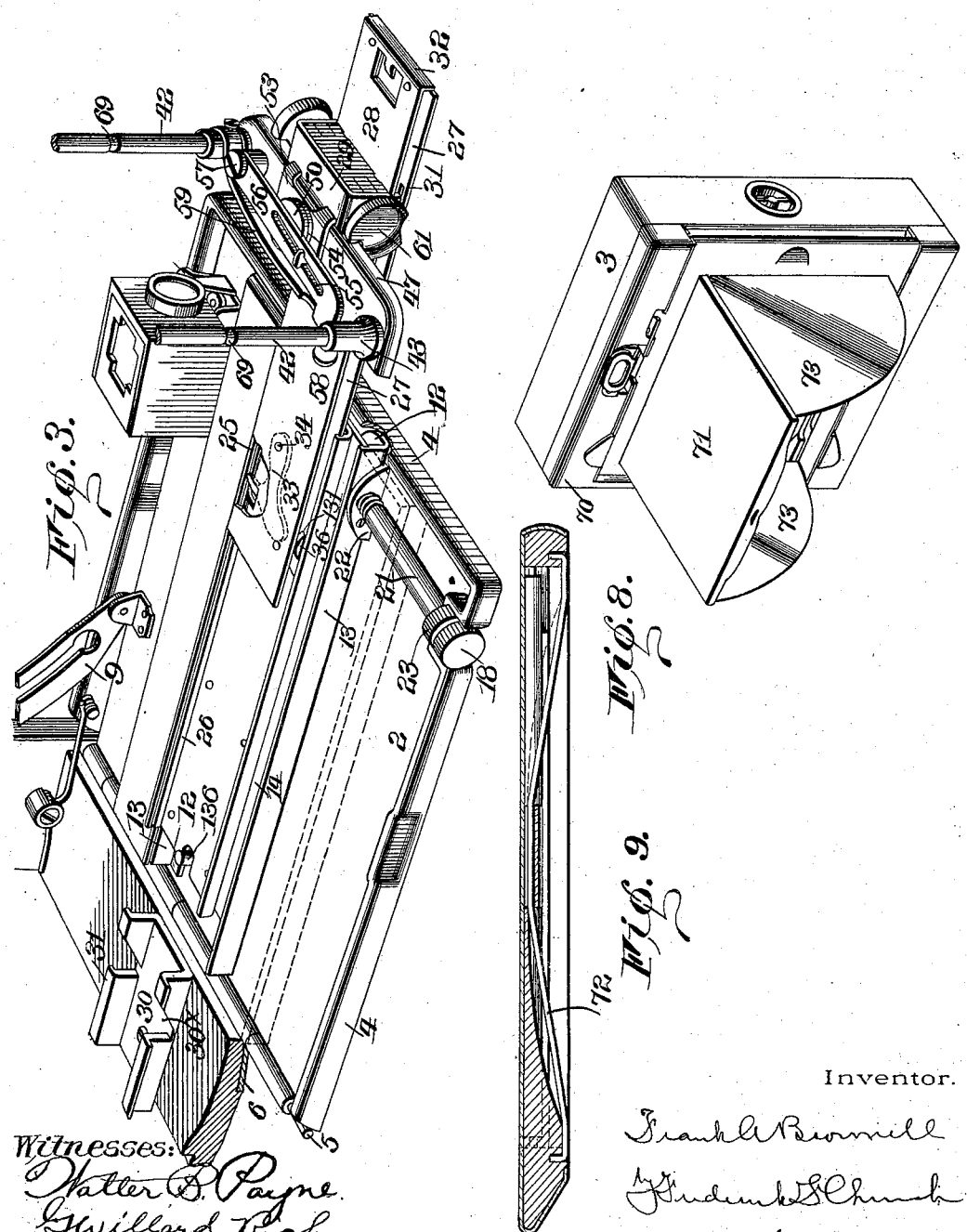

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

FOCUSING DEVICE FOR PHOTOGRAPHIC CAMERAS.

SPECIFICATION forming part of Letters Patent No. 692,610, dated February 4, 1902.

Original application filed September 24, 1900, Serial No. 30,960. Divided and this application filed September 20, 1901. Serial No. 75,814. (No model.)

*To all whom it may concern:*

Be it known that I, FRANK A. BROWNELL, of Rochester, in the county of Monroe and State of New York, have invented certain new and useful Improvements in Focusing Devices for Photographic Cameras; and I do hereby declare the following to be a full, clear, and exact description of the same, reference being had to the accompanying drawings, forming a part of this specification, and to the reference-numerals marked thereon.

My present invention relates to photographic cameras, and has for its object particularly to provide an improved bed or support for the lens-carriage and means for focusing or causing the relative adjustments of the lens and sensitized film or plate, whereby the lens-support may be moved outward quite a distance and locked and secured firmly when a lens of extra long focus is employed and whereby also the approximate and fine focusing adjustments may be quickly and accurately accomplished.

The invention is particularly applicable to folding cameras—such, for instance, as shown in my former application, Serial No. 30,960, filed September 24, 1900, of which this is a division—the said parts being so constructed that the camera may be folded or collapsed into small compass.

A further object of my invention is to provide vertical and lateral adjustments for the lens by means of which the operator may easily shift it laterally and vertically from its central or normal position and automatically secure it and also to provide a hood or screen for the focusing-surface which shall be contained within the camera and adapted to obviate the use of the usual focusing-cloth.

To these and other ends the invention consists in certain improvements in construction and combinations of parts, all as will be hereinafter fully described, the novel features being pointed out in the claims at the end of this specification.

In the drawings, Figure 1 is a side elevation, partly in section, of a camera provided with a focusing device constructed in accordance with my invention. Fig. 2 is a sectional view taken on the line $a\ a$ of Fig. 1 looking toward the rear of the camera. Fig. 3 is a perspective view showing the track-plates and adjusting devices for the lens-support. Fig. 4 is a longitudinal sectional view on the line $b\ b$ of Fig. 2. Fig. 5 is a sectional view on the line $c\ c$ of Fig. 1 looking upward. Fig. 6 is a horizontal sectional view taken on the line $e\ e$ of Fig. 1. Fig. 7 is a similar view on the line $f\ f$ of Fig. 1. Fig. 8 is a perspective view of the rear of the camera, showing the focusing-hood open; and Fig. 9 is a sectional view on the line $g\ g$ of Fig. 1.

Similar reference-numerals in the several figures indicate similar parts.

The camera forming the subject-matter of my present invention is adapted to be folded into small compass with the operating parts all inclosed, so that it may be readily carried by the operator, and to this end the camera-body proper embodies an open frame or casing 1, to the lower front edge of which is hinged a lid or door 2 and to the rear side is applied an open frame 3, carrying at its rear the focusing-screen of ground glass $3^\times$ and connected to the frame 1 at the sides in such manner that it may be adjusted rearwardly and turned or tilted with relation to the frame 1 and operate as a tilting swing-back for maintaining in vertical position the plate or film when the front of the camera and lens is elevated or depressed, a form of mechanism for this purpose being shown in the parent application before referred to. The lid or door 2 is preferably formed of sheet metal, having the side and end flanges 4 adapted to fit within the front edge of the frame 1 and having its rear edge turned over to form a hinge member, through which extends the pintle or rod 5, also operating in suitable ears in a plate 6, secured to the lower side of the frame 1. The dimensions of the lid or door are such that it will fit snugly within the front of the frame 1 and may be fastened with its outer surface flush with the frame by means of a suitable spring-catch, such as 7, adapted to engage a suitable projection arranged upon said lid. The door 2 is provided with an aperture in its outer face and upon its inner face with a nut or threaded socket 8, adapted to receive the screw of a tripod-head.

9 indicates suitable links pivoted to the door 2 and slotted for the accommodation of the shanks of the headed pins 10, secured to the inner side of the frame 1, said links being provided with springs 11, which coöperate with the pins 10 and force the links vertically, so that the lateral slots in the ends will engage the pins and normally hold the door at right angles, as shown in Fig. 1.

In the present embodiment of my invention the door 2 constitutes a camera-bed on which the adjustable or focusing parts of the camera move, and therefore upon the inner side of the door and near the center thereof is provided a plate 12, having the upwardly-extending grooved flanges 13, forming a way in which is arranged an adjustable support or bed extension section in the form of a plate 14, having upon its lower side a rack 15, with which coöperates a pinion 16 upon an adjusting shaft or arbor 17, journaled in the flanges 13, said shaft or arbor having upon its outer end a longitudinally-adjustable sleeve provided with a milled head 18 and with a slot in which operates a screw 19, secured to the arbor so that it may be adjusted longitudinally of the latter, but turn with it, a small friction-spring 20 being arranged between the arbor and sleeve to prevent accidental movement. (See Fig. 2.)

21 indicates a tubular locking-screw screwing in a nut 22 at its inner end and operating upon one of the flanges 13 to clamp the latter upon the section 14 and secure it in adjusted position, said clamping-screw having the milled head 23, as shown in Figs. 2 and 5. Both the milled heads 18 and 23 are located in a recess formed at one side of the door, so as to permit the latter to be closed within the frame 1.

To the inner side of the door 2 are fastened wooden strips 25, serving to cover and protect the flanges 13 of the way-plate 14 and to stiffen the parts.

Secured to the upper side of the section 14 is a plate having vertically-extending grooved flanges 26, the grooves forming ways in which operate the edges of a longitudinally-adjustable plate or slide 27, having secured to its upper side a way-plate 28, upon which latter slides the block or carriage constituting the lens-support. This carriage in the present instance embodies the metal frame or casing 29, having the depending flanges provided with grooves for the reception of the edges of the plate 28, and the frame or carriage is adapted to be adjustably secured to the plate 28 by suitable devices hereinafter described.

Located in the bottom of the frame 1 is a bracket 30, having at its upper side flanges 31, which when the door 2 is opened extends in line with the edges of way-plate 28, so that the carriage carrying the lens-support may slide from the plate 28 upon said flanges, which therefore constitute a continuation of the ways for the lens-support when it is desired to fold up the door and close the camera.

It will be noted that the lens-support is adjustable upon the way-plate 28, the slide carrying the latter is adjustable upon the section 14, and the latter upon the flange-plates 13, secured to the door or support 2, and that therefore the lens may be adjusted outwardly approximately three times the length of the door 2; but in order to prevent the outward movement of the way-plate 28 until the lens carriage or support is moved outward to its extreme outer end and also to insure the extreme inward movement of the plate 28 before or when the lens-support is moved onto the ways 31 within the frame 1 when the camera is to be closed I provide catches between the slide carrying the plate 28 and the section 14 on the door 2 and also between the way-plate 28 and the lens carriage or frame and a locking or fastening device between the section 14 and the ways 13, as will be described. In carrying out this portion of the invention I provide the edge of the slide 27 near the forward portion with a small slot 31, through which is adapted to extend the end of a spring-catch 36, secured to the section 14, when the slide 27 is in the rearmost position, the upper end of said spring-catch projecting upward far enough to be engaged by the lower edge of the flange on the plate upon the lens-carriage 29, so that while said catch normally holds the slide 27 when the lens-carriage is moved outward the flange of the carriage 29 will engage with and depress the catch, allowing said slide 27 to be carried outward by the carriage, the forward end of which engages with a downwardly-extending flange 32, formed on the end of the plate 28, as shown in Fig. 1. At the rear end of the slide 27 is provided an opening 131, similar to 31, with which the catch 36 engages when the slide is drawn to its extreme outward position, so that the latter is locked to the section 14 until the flange on the carriage again engages the catch 36 and releases it from the aperture 131 upon the inward movement of the lens-carriage.

At the rear end of the slide 27, upon the under side thereof, is arranged a catch 33, pivoted at 34 and provided with a spring 35, all as shown in Fig. 5, said spring operating normally to throw the pointed end of the catch forward through an opening in the slide 27 and into the path of the flange or projection on the lens-carriage 29. The catch is also provided with an extension adapted to engage a stationary pin or projection 136, secured to the door or bed 2, the relation of the parts being such that when the slide 27 is drawn outward the extension of the catch 33, being removed from the stop or pin 136, will permit the spring to throw the end of the catch outward into the path of the projection or flange on the lens-carriage, so that as said lens-carriage is moved backward to return the lens-support to the casing the slide 27 will be carried by it until the catch is tripped by engagement with the stop 136, when the catch will be withdrawn and the lens-carriage can move upon the supplemental ways or guides within the frame or casing 1.

When the camera is used with ordinary short-focus lenses, the carriage 29 need not be moved outwardly far enough to disengage the catch 36, and the fine focusing adjustment may be accomplished by loosening the clamping-screw 21 and manipulating the arbor 17, in which case the section 14 and slide 27 are locked and moved together. If a greater movement of the lens-carriage 29 than that described is required for the coarse adjustment, the latter is moved outward to the end of the slide 27, disengaging catch 36 from its forward end and carrying said slide outward with it as far as desired. If the outward movement is sufficient to draw the slide 27 so that the catch 36 engages the recess 131, the section 14 and slide 27 are locked rigidly together and the fine adjustment may be accomplished by the arbor 17, as before. In both the instances described the fine adjustment may be accomplished by the arbor 17 while the slide 27 and section 14 are locked together by the catch 36, with the slide 27 either extended or retracted, as will be understood.

The slide is movable upon the way on the section 14, which latter constitutes a support for the slide, and while it may be maintained stationary it is also adjustable upon the guides on the bed or door either for an accurate adjustment or to provide an extended base when desired, or both.

The bracket 30, having the supplemental ways, is slotted or recessed in its upper side, as at 30ˣ, so that when the door or bed is closed against the frame 1 the inner ends of the way-plates may not interfere with the track-slides 14 and 27, which latter are raised somewhat above the bottom of the frame, as are also the upper portions of the bracket 30.

The lens of the camera is mounted in a suitable frame 40, either with a shutter of any suitable construction, as shown, or without, said frame being provided at the side with vertically-perforated ears 41, two on each side, through which extend supporting-standards 42, fastened at their lower ends by socket-pieces 43 and nuts 44 to the end of a transversely-extending plate 45, having at the rear a flange 46, extending over the rear end of the plate 29, constituting the carriage, and also having at the front side a flange 47, extending in a transverse slot in the carriage 29, as shown in Fig. 1, the flanges 46 and 47 forming guides during the lateral adjustment of the plate carrying the standards. The plate 45 is provided with a central longitudinally-extending slot 48, through which passes the shank of a pin 49, said pin having upon its upper end a head 50, provided with a transverse cam groove or notch and also provided with a threaded portion 51, upon which is secured an adjustable nut 52, arranged beneath the plate constituting the carriage 29, said pin extending below the nut and serving as the centering device for the carriage-clamping mechanism, as will be described.

53 indicates a washer-plate on top of the frame 45 and prevented from turning thereon by flanges, as shown, and 54 a cam-plate encircling the stud or pin 49, having a cam projection coöperating with the cam-recesses in the under side of the head 50, and having an upwardly-extending arm engaging in a slot 55 in a thumb-lever 56, pivoted at 57, and having the operating portion 58 arranged near one of the standards 42.

59 indicates a spring secured to a standard and engaging the lever 56 and moving it in a direction to turn the cam-plate 54 and cause it to bind the plate 45 and secure the latter to the plate or frame 29, as will be understood.

In order to provide for the vertical adjustment of the lens-frame 40 upon the standards 42, I provide the latter with a series of annular notches 65 near their upper ends, with the inner sides of which coöperate projections or shoulders 66, formed upon spring-arms 67, secured to the sides of the lens-frame, the extreme ends of said spring-arms extending outward around the standards, as shown at 68, to form grasping portions, by means of which the operator may compress the portions 68 between his fingers and raise or lower the lens-frame and allow it to be secured by the engagement of the spring-catches. To insure the lens being left in normal or central position, I provide upon the standards 42 grooves 69, with which coöperate the lower free ends of the spring-arms 67, these serving as centering devices, as will be understood.

The location of the end of the lever 58 to one of the pillars or standards 42 permits the operator by grasping these parts between his finger to release the frame 45 and adjust the support and lens laterally, as may be desired, the spring automatically securing them when pressure upon the lever is released.

Mounted upon the lower end of the pin 49 and so as to turn or pivot thereon are two cam-levers 60, their outer ends being connected by a slot-and-pin connection with the headed pins 61, sliding in the carriage 29.

62 indicates spring-arms, formed preferably of a single piece of spring-wire, operating upon the pins 61 to move them outward and turn the cam-levers 60 upon the pivot in such manner that the cam projections will extend across each other and move a clamp-block 63, arranged beneath them, down into contact with the upper side of the way-plate 28, thereby locking the latter and the carriage 29 firmly together. To cause the release of said carriage from its way and the longitudinal adjustment thereof in the manner described, the operator grasps and presses inward the thumbpieces 61 and moves the carriage in or out, the connections described preventing it from slipping from the way-plates.

At the rear of the open frame 3 is provided a frame 70, carrying the usual focusing-screen of ground glass or similar material, (indicated by 3×,) and in order to obviate the necessity of employing a removable focusing-cloth I provide at the rear of the frame 70 a door or lid 71, hinged at the upper edge and provided with a lug operated upon by a wing or leaf spring 72, (see Figs. 1 and 9,) adapted to normally maintain said door or lid elevated to permit the examination of the image upon the ground glass. At the sides of this door are triangular flexible wings 73, connected to the door-frame and serving not only to limit the opening movement of the door, caused by the spring, but to shade the ground glass at the side and form a shade or hood, so that the image may be visible to the operator. These wings or sides fold between the door and ground glass when the former is closed, and the door is maintained normally closed against the tension of the spring by a small movable catch-plate 74. In order, therefore, to inspect the ground glass for focusing, it is only necessary for the operator to release the catch, when the door will fly open to the position shown in Fig. 8.

The particular construction of the swing-back and its adjusting mechanism is not claimed nor fully shown herein, but is retained in my pending application of which this is a division.

I claim as my invention—

1. In a camera, the combination with a support having a guide or way thereon, a slide movable upon the way, and a catch arranged between the slide and way adapted to lock the slide at either extreme of its movements, of a carriage movable on the slide and coöperating therewith to operate it and also coöperating with the catch to disengage the slide from the way.

2. In a camera, the combination with a support having a guide or way thereon, a slide movable on the way, and a catch arranged between the slide and way to secure the latter at either extreme of its movements, of a carriage movable on the slide and engaging the latter near opposite ends to move it and also coöperating with the catch to release the slide when in position to engage and move the latter.

3. In a camera, the combination with a support, a way thereon, a slide movable on the way and detachable fastening devices for securing the slide to the way, of a carriage movable upon the slide and adapted to engage the latter to move it and also adapted to coöperate with the fastening devices to disengage the slide from the way, and detachable clamping devices for securing the carriage upon the slide.

4. In a camera, the combination with a support, a way thereon, a slide movable on the way and detachable fastening devices for securing the slide to the way, of a carriage movable upon the slide and adapted to engage the latter to move it and also adapted to coöperate with the fastening devices to disengage the slide from the way and automatic clamping devices on the carriage adapted to engage the slide and having operating portions which, when grasped by the operator, serve to release the carriage and operate as handles for adjusting the latter.

5. In a camera, the combination with a support, a way thereon, a slide movable on the way, and a spring-catch adapted to engage and lock the slide at both extremes of its movement, of a carriage movable on the slide and engaging the ends of the latter to move it and also coöperating with the catch to release the latter when the carriage is at the end of the slide with which the catch is engaged.

6. In a camera, the combination with a support, a way thereon, a slide movable on the way and a catch arranged between the slide and its way to secure the former to the latter at both extremes of its movement, of a carriage movable upon the slide and adapted to engage and move the slide in both directions and coöperating with the catch to release the slide from its way and a detachable connection between the carriage and slide operated to release the latter from the former when at one extreme of its movement on the way.

7. In a camera, the combination with a support, a way thereon, a slide movable on the way and a catch for holding the slide at either extreme of its movement, of a carriage movable on the slide, engaging the latter to operate it in one direction and also adapted to release the catch, a movable stop on the slide adapted to be engaged by the carriage to operate the slide in one direction and means for releasing said catch when the slide is at one extreme of its movement.

8. In a camera, the combination with a support, a way thereon, a slide movable on the way and a catch at the forward portion of the way adapted to engage and lock the slide at either extreme of its movement, of a carriage movable on the slide and coöperating with the catch to release it, a movable abutment on the slide engaged by the carriage and a stop for moving the abutment out of the path of the carriage when the slide is detained by the catch at one extreme of its movement.

9. In a camera, the combination with a support, a way thereon, a slide movable on the way and locking devices for securing the slide at either extreme of its movement, of a carriage movable on the way adapted to engage and release the locking devices, connections between the carriage and the slide for operating the latter by the movement of the former in one direction and means for disengaging the carriage from the slide when the latter is secured to the way by the locking devices.

10. In a camera, the combination with a support, a way thereon, a slide movable on the way and a catch for holding the slide at both extremes of its movement, of a carriage movable on the slide and coöperating with the latter to move it in one direction, a movable projection on the slide adapted to be engaged by the carriage to cause the latter to move with it, means for withdrawing the projection when the slide is at one extreme of its movement and secured by the catch.

11. In a camera, the combination with a support, a way thereon, a slide movable on the way and a supplemental way in line with the slide, of a carriage movable upon the slide and the supplemental way, locking devices for securing the slide at the extremes of its movement and adapted to be released by the carriage and connections between the carriage and slide for causing the movement of the latter by the former in both directions and means for releasing the carriage from the slide when the former is moved toward the supplemental way.

12. In a camera, the combination with a support, a way thereon, a slide movable on the way and a supplemental way in line with the slide, of a catch on the way engaging the slide to lock it, a carriage movable on the slide and supplemental way, and engaging the former to move it in one direction, a movable catch on the slide engaged by the carriage to move the former in the opposite direction, a stationary stop engaged by the catch to release the carriage from the slide, said carriage operating to release the catch holding the slide when moved over it.

13. In a camera, the combination with a way, a slide movable thereon and a supplemental way in line with the slide, of a carriage movable upon the slide and supplemental way, locking devices for the slide released by the carriage, detachable connections between the carriage and slide released by the movement of the latter on the way and connections between the carriage and slide for moving the latter in one direction by the movement of the former, the parts arranged and operating substantially as described.

14. In a camera, the combination with the main frame having the supplemental way thereon, the hinged bed having the way, the slide on the way and the carriage movable on the supplemental way and upon the slide, locking devices between the slide and its way released by the carriage when at the ends of the slide, a detachable connection between the carriage and slide, and means for releasing it when the slide is adjacent to the supplemental way, whereby the carriage may move from the slide to the supplemental way freely and when moved in the opposite direction on the slide will disengage the latter from its way and carry it outward with it.

15. In a camera, the combination with the bed having a stationary way thereon, an extension-section movable on the way having a way and a rack thereon, a movable pinion mounted on the bed and coöperating with the rack, and a movable slide, of a carriage movable upon the slide, a catch between the slide and its way adapted to be released by the carriage when at the extremes of its movement on said slide and means for clamping the carriage on the slide.

16. In a camera, the combination with the way-plate 14, having the spring-catch 36 and the slide 27, having the apertures 31 and 131 coöperating with the catch, of the plate 28, the carriage 29 operating on the plate 28 and adapted to coöperate with the catch and coöperating projections between the carriage and the ends of the plate 28.

17. In a camera, the combination with the plate 14 having the spring-catch 36, the slide 27 having the apertures 31 and 131 and the catch 33 and the plate 28, of the carriage 29 adapted to engage catches 36 and 33 and the stop 136 coöperating with the catch 33, substantially as described.

18. In a camera, the combination with a way, a carriage movable thereon and supporting a lens, of a pair of spring-operated clamping cam-levers arranged between the carriage and the way, a movable block or plate operated by said levers and coöperating with the way and operating finger-pieces on opposite sides of the carriage and connected to the levers for simultaneously operating the levers and serving as a means for adjusting the carriage.

19. In a camera, the combination with a way, a carriage movable thereon and supporting a lens, a movable clamping-piece coöperating with the top of the guide, and the two rotary spring-operated cam-plates mounted on a vertical center and arranged between the clamping-piece and carriage, and the finger-pieces connected to the ends of the levers and projecting at the sides of the carriage whereby the cams may be released and the carriage operated.

20. In a camera, the combination with the movable carriage, the laterally-adjustable frame, and a lens-frame carried thereby, of a spring-operated clamping device arranged between the carriage and adjustable frame having an operating finger-piece at one side of the frame and in proximity to a stationary part thereof whereby the operator may grasp the finger-piece and frame and simultaneously release and adjust the latter.

21. In a camera, the combination with the way, a carriage adjustable thereon, the vertical pin on the carriage, the two spring-operated cam-levers pivoted on the pin between the carriage and way having the operating finger-pieces at the sides, of the laterally-movable frame having the slot for the vertical pin, the spring-operated cam-lever coöperating with the pin and the laterally-movable frame having an operating portion in proximity to a stationary portion of the latter.

22. In a camera, the combination with the way-plate, the carriage 29, the block 63 and the rotary cam-levers 60 arranged between the block and way-plate, of the spring 62 operating on the cam-levers and the finger-pieces 61 connected to the cam-levers and arranged at the sides of the carriage.

23. In a camera, the combination with the carriage 29, the pin 49, and the cam-plate 54, of the slotted lever 56 engaging the cam-plate, the operating-handle having the spring 59 for operating it, and the slotted frame carrying the lens with which the cam-plate coöperates.

24. In a camera, the combination with the carriage, and the laterally-movable plate having the guiding-flanges extending over the carriage, of the standards having the threaded extensions passing through the ends of the plate, the nuts on the ends of the standards, and the lens-frame vertically adjustable on the standards.

25. In a camera, the combination with a frame or support, the notched standards secured thereto, and the lens-frame having the perforated ears sliding on the standards, of the spring-catches secured to the lens-frame inside of the standards and adapted to automatically engage the notches on the standards to lock the lens-frame thereto, said catches having grasping portions extending outside of the standards and opposite each other serving as handles for raising or lowering the lens-frame when they are operated to release the latter.

26. In a camera, the combination with the frame having the notched standards, of the lens-frame guided to move upon the standards, the spring-catches engaging the notches and having the oppositely-arranged operating portions, and the centering-springs on the lens-frame coöperating with the notches on the standards.

27. In a camera, the combination with the focusing-glass frame having the openings, of the hinged door extending over the opening having the extension beyond the hinge-pintle, the spring operating upon said extension to open the door, the flexible cover-pieces at the sides, and the catch for holding the door closed against the tension of the spring.

28. In a camera, the combination with a support having a way thereon, of a slide movable on the way, and means for locking the slide to the way both when extended and when retracted, and a carriage movable on the slide.

29. In a camera, the combination with a support having a way thereon, of a slide movable on the way, a single locking device arranged between the slide and way and adapted to lock the slide in either extended or retracted position and a carriage movable on the slide.

30. In a camera, the combination with the bed having the way, the support on the way and means for adjusting it, of the slide movable on the support, a catch between the slide and support for locking the former in extended or retracted position, and a carriage movable on the slide.

31. In a camera, the combination with the bed, the support movable thereon and means between the bed and support for moving the latter, of the slide movable on the support, a spring-catch for locking the slide to the support in two positions and means for releasing the catch.

32. In a camera, the combination with the bed, the support adjustable thereon and means for locking the parts together, of a slide movable on the support and an automatic catch for locking the slide in retracted position.

33. In a camera, the combination with a support, and a slide movable thereon, of automatically-engaging catch devices for locking the slide in extended and retracted positions.

34. In a camera, the combination with a support, a slide movable thereon, and a supplemental way in line therewith, of a carriage movable on the slide and supplemental way, a catch for locking the slide in retracted position and means for preventing the removal of the carriage from the slide until the latter is locked to the support.

35. In a camera, the combination with the frame having the way therein provided with the recess in its upper portion, of the bed hinged to the frame, the ways thereon and the carriage adjustable on the ways in the frame and bed.

FRANK A. BROWNELL.

Witnesses:
WILLIAM S. HOVEY,
G. WILLARD RICH.